United States Patent
Kwak et al.

(10) Patent No.: US 8,168,318 B2
(45) Date of Patent: May 1, 2012

(54) METHOD FOR HIGH VOLUME MANUFACTURING OF THIN FILM BATTERIES

(75) Inventors: Byung Sung Kwak, Portland, OR (US);
Nety M. Krishna, Sunnyvale, CA (US);
Kurt Eisenbeiser, Tempe, AZ (US);
William J. Dauksher, Mesa, AZ (US);
Jon Candelaria, Scottsdale, AZ (US)

(73) Assignees: Applied Materials, Inc., Santa Clara, CA (US); Motorola Mobility, Inc., Libertyville, IL (US)

( * ) Notice: Subject to any disclaimer, the term of this patent is extended or adjusted under 35 U.S.C. 154(b) by 766 days.

(21) Appl. No.: 12/257,049

(22) Filed: Oct. 23, 2008

(65) Prior Publication Data
US 2009/0148764 A1   Jun. 11, 2009

Related U.S. Application Data

(60) Provisional application No. 60/982,669, filed on Oct. 25, 2007.

(51) Int. Cl.
*H01M 6/16* (2006.01)
*H01M 6/18* (2006.01)
*H01M 6/46* (2006.01)

(52) U.S. Cl. ........ 429/144; 429/152; 429/141; 429/162; 427/58

(58) Field of Classification Search ........................ None
See application file for complete search history.

(56) References Cited

U.S. PATENT DOCUMENTS

| | | | |
|---|---|---|---|
| 5,612,152 A | 3/1997 | Bates | |
| 6,094,292 A * | 7/2000 | Goldner et al. | 359/265 |
| 7,433,655 B2 * | 10/2008 | Jacobs et al. | 455/90.3 |
| 2003/0068559 A1 * | 4/2003 | Armstrong et al. | 429/234 |
| 2006/0284190 A1 | 12/2006 | Zimmerman et al. | |
| 2007/0139001 A1 | 6/2007 | Hahn | |
| 2007/0164376 A1 | 7/2007 | Burrows et al. | |
| 2007/0184345 A1 | 8/2007 | Neudecker et al. | |

FOREIGN PATENT DOCUMENTS

WO    03/022564 A1    3/2003

OTHER PUBLICATIONS

International Search Report and Written Opinion of the International Searching Authority mailed Dec. 24, 2008 in PCT/US08/80884.

* cited by examiner

*Primary Examiner* — Krishnan S Menon
(74) *Attorney, Agent, or Firm* — Patterson & Sheridan, LLP

(57) ABSTRACT

Concepts and methods are provided to reduce the cost and complexity of thin film battery (TFB) high volume manufacturing by eliminating and/or minimizing the use of conventional physical (shadow) masks. Laser scribing and other alternative physical maskless patterning techniques meet certain or all of the patterning requirements. In one embodiment, a method of manufacturing thin film batteries comprises providing a substrate, depositing layers corresponding to a thin film battery structure on the substrate, the layers including, in order of deposition, a cathode, an electrolyte and an anode, wherein at least one of the deposited layers is unpatterned by a physical mask during deposition, depositing a protective coating, and scribing the layers and the protective coating. Further, the edges of the layers may be covered by an encapsulation layer. Furthermore, the layers may be deposited on two substrates and then laminated to form the thin film battery.

12 Claims, 8 Drawing Sheets

610

100

FIG. 6A
610
100
FIG. 6B
620
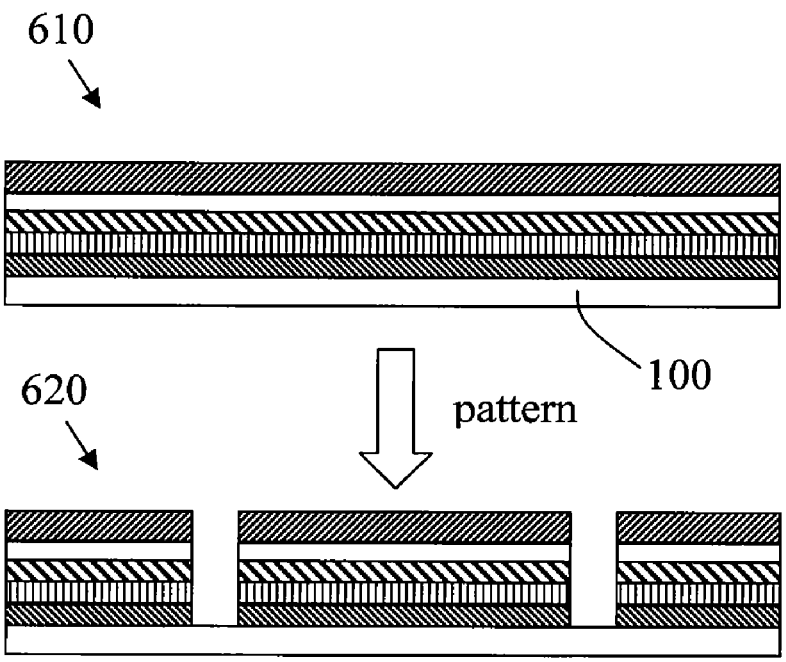
pattern
FIG. 6C
630  614
edge encapsulation
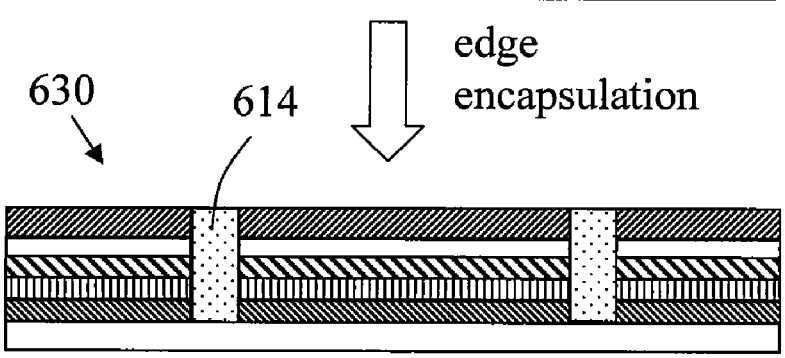
cut
FIG. 6D
601
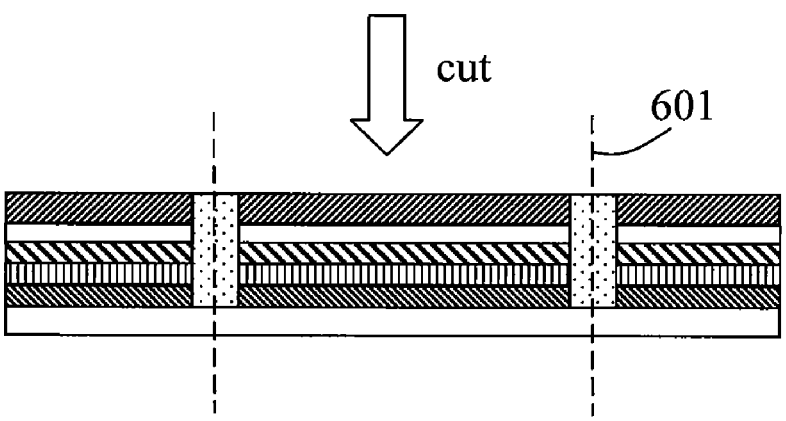

METHOD FOR HIGH VOLUME MANUFACTURING OF THIN FILM BATTERIES

CROSS-REFERENCE TO RELATED APPLICATIONS

This application claims benefit of U.S. Provisional Patent Application Ser. No. 60/982,669, filed Oct. 25, 2007, which is herein incorporated by reference.

FIELD OF THE INVENTION

The present invention relates generally to thin film batteries, and more particularly to a method for fabricating thin film batteries that is low-cost and compatible with high-volume manufacturing.

BACKGROUND OF THE INVENTION

Solid state Thin Film Batteries (TFB) are known to exhibit several advantages over conventional battery technology such as superior form factors, cycle life, power capability and safety. However, there is a need for cost effective and high-volume manufacturing (HVM) compatible fabrication technologies to enable broad market applicability of TFBs.

Past approaches to the patterning requirements for the TFB fabrication consisted of applying known methods of masking/patterning, such as photolithography and physical (shadow) masking. An example of the use of photolithography can be seen in an article published by W. C. West, et. al., in Journal of Micromech. and Microeng. (Vol. 12 (2002) 58-62). The use of physical (shadow) masking can be seen in many publications and patents, as implied by the schematic diagrams of the TFB process flows (see for example, U.S. Pat. No. 6,921,464 to Krasnov et. al. and U.S. Pat. No. 6,994,933 to Bates et. al.) and by their specific statements (see for an example, U.S. Pat. Pub. No. 2005-0079418A1 to Kelley et. al.). All of these use masking/patterning technology at every step of the fabrication process.

The traditional physical masking requirement leads to many disadvantages, especially related to HVM. For example, the use of physical masking will (1) add significant capital investment requirement for HVM and large area scaling, (2) increase cost of ownership (consumable mask cost, cleaning, chemicals, etc.), (3) decrease throughput because of alignment requirements, and (4) limit the substrate size and type (rigid, semi-rigid, or flexible), and thereby, limit the scaling for economy and cost reduction.

More particularly, in HVM processes, the use of physical masks (ubiquitous for traditional and current state-of-the-art TFB fabrication technologies) will contribute to higher complexity and higher cost in manufacturing. The complexity and cost result from the required fabrication of highly accurate masks and (automated) management systems for mask alignment and regeneration. Such cost and complexity can be inferred from well known photolithography processes used in the silicon-based integrated circuit industry. In addition, the cost results from the need for maintaining the masks as well as from throughput limitations by the added alignment steps. The adaptation becomes increasingly more difficult and costly as the manufacturing is scaled to larger area substrates for improved throughput and economies of scale (i.e., high volume manufacturing). Moreover, the scaling (to larger substrates) itself can be limited because of the limited availability and capability of the physical masks.

Another impact of the use of physical masking is the reduced utilization of a given substrate area, leading to non-optimal battery densities (charge, energy and power). This is so because of the fact that physical masks cannot completely limit the sputtered species from depositing underneath the masks, which in turn leads to some minimum non-overlap requirement between consecutive layers in order to maintain electrical isolation between key layers. The consequence of this minimum non-overlap requirement is the loss of cathode area, leading to overall loss of capacity, energy and power content of the TFB (when everything else is the same).

Yet another impact of the use of physical masking, in the typical integration schemes used previously, is the need for complex protective coatings to keep the anode (typically Li or Li-ion) from reacting with oxidants ($O_2$, $H_2O$, etc.) from the ambient. There are several patents that deal with such schemes (see for examples, U.S. Pat. No. 5,561,004 to Bates et al. and U.S. Pat. No. 6,916,679 to Snyder et al., for multi-layer coating and lamination, respectively).

And finally, processes that employ physical (shadow) masks typically suffer from particulate contamination, which ultimately impacts the yield.

Therefore, there remains a need for concepts and methods that can significantly reduce the cost by enabling simplified, more HVM-compatible TFB process technologies.

SUMMARY OF THE INVENTION

Concepts and methods of the invention allow the cost and complexity of TFB HVM to be reduced by eliminating and/or minimizing the use of physical (shadow) masks to enhance manufacturability of the products at high volume and throughput and the technique is easily adapted to large area substrates. This can significantly reduce the cost for broad market applicability as well as provide yield improvements. These and other advantages are achieved with the use of laser scribing or alternative maskless patterning techniques to meet certain or all of the patterning requirements. Alternative physical (shadow) maskless patterning techniques include mechanical sawing, water/solvent knifing, ion beam milling and multi-layer photolithography. As such, embodiments of the invention provide for the use of laser scribing, or other alternative maskless patterning techniques, anywhere during the manufacturing process as deemed appropriate and necessary for TFB manufacturability, yield and functionality. This includes a method where a single patterning is performed at the end of the deposition of all layers. Furthermore, embodiments of the invention provide methods which include multiple patterning, wherein each patterning addresses single or multiple stack layers, such that some physical (shadow) masking has been eliminated. If the physical masking is deemed necessary in some cases, then the disclosed concept can be implemented in conjunction with a minimum number of required physical masks. Preferably, for such processes wherein separate masking/patterning is necessary, laser scribing or alternative physical maskless patterning techniques would be used. Furthermore, the disclosed concept can be implemented with other physical maskless patterning techniques, like photolithographic patterning, in some cases where single, multiple or all layers are patterned simultaneously.

According to aspects of the invention, a first method of manufacturing thin film batteries comprises providing a substrate, depositing layers corresponding to a thin film battery structure on the substrate, the layers including, in order of deposition, a cathode, an electrolyte and an anode, wherein at least one of the deposited layers is unpatterned by a physical mask during deposition, depositing a protective coating, and scribing the layers and the protective coating. Further, the edges of the layers may be covered by an encapsulation layer. Furthermore, the scribing may also cut through the substrate, producing a multiplicity of thin film batteries.

According to further aspects of the invention, a second method of manufacturing thin film batteries comprises providing a first substrate, depositing a first set of layers on the first substrate, providing a second substrate, depositing a second set of layers on the second substrate, laminating the first set of layers and the second set of layers, and scribing the laminated structure, wherein the combined first and second sets of layers corresponds to a thin film battery structure, including a cathode, an electrolyte, and an anode and wherein at least one layer of the first and second sets of layers is unpatterned by a physical mask during deposition. Further, the first set of layers may include the cathode and the electrolyte. Furthermore, the first set of layers may be capped by a first lithium metal layer and the second set of layers capped by a second lithium metal layer, wherein the first and second lithium metal layers together form the anode in the laminated structure.

According to yet further aspects of the invention, a thin film battery, corresponding to the aforementioned methods, comprises a first substrate, a set or plurality of layers corresponding to a thin film battery structure attached to the first substrate, the set or plurality of layers including, in order from the first substrate, a cathode, an electrolyte, an anode and a protective coating, wherein at least one of the layers is unpatterned, a protective coating covering the set or plurality of layers, and an encapsulating layer covering the edges of the layers. Furthermore, the protective coating may be a second substrate.

By following the disclosed concepts and resulting methods, many advantages in addition to high volume and throughput and reduced costs are achieved. For example, non-functional area is minimized or eliminated. Another is that the laser and other alternative methods allow flexibility in device patterning to accommodate end-market defined form factors, without having to create new expensive physical masks or reticles (for lithography). As another benefit, the anode current collector functions as the protective coating, eliminating or minimizing the need for complex multilayers or other schemes to package the device. An additional benefit is the positive impact to yield that will be realized.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein:

FIGS. 6A to 6D illustrate additional aspects of an example HVM TFB fabrication process of the present invention.

DETAILED DESCRIPTION OF THE PREFERRED EMBODIMENTS

Embodiments of the present invention will now be described in detail with reference to the drawings, which are provided as illustrative examples so as to enable those skilled in the art to practice embodiments of the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary to describe embodiments of the present invention will be discussed, and detailed descriptions of other portions of such known components will be omitted. In the present specification, an embodiment showing a singular component should not be considered limiting; rather, embodiments of the invention broadly encompass other variations including a plurality of the same component, and vice-versa, unless explicitly stated otherwise herein. Moreover, applicants do not intend for any term in the specification or claims to be ascribed an uncommon or special meaning unless explicitly set forth as such. Further, embodiments of the present invention broadly encompass present and future known equivalents to the known components referred to herein by way of illustration.

In general, embodiments of the present invention provide alternative methods of patterning certain or all layers in a thin film battery structure using laser scribing or alternative maskless patterning techniques. Laser scribing techniques have been applied in fields other than manufacturing thin film batteries, such as semiconductors (for example, U.S. Pat. No. 7,169,687 to Li et al. and U.S. Pat. No. 6,586,707 to Boyle et al.), photovoltaics (e.g., U.S. Pat. No. 7,235,736 to Buller et al. and U.S. Pat. No. 4,689,874 to Nishiura) and electrochromics (e.g., U.S. Pat. No. 5,724,175 to Hichwa et al.). However, integration of laser scribing into a HVM TFB process requires a new approach, as described below. Again, the integration with laser scribing is used in these examples. However, alternative physical maskless methods can be used interchangeably.

For ease in illustrating certain aspects of the invention, a traditional thin film battery process flow is considered. FIGS. 1A to 1F illustrate a traditional process flow for fabricating a TFB on a substrate. In FIGS. 1A-1F, a top view is shown on the left, and a corresponding cross section, in the plane indicated by A-A, is shown on the right. There are also other variations, e.g., an "inverted" structure, wherein the anode side is grown first. In the prior art process of FIGS. 1A-1F, physical (shadow) masking is used to define the areas at each layer.

Figure 1A:
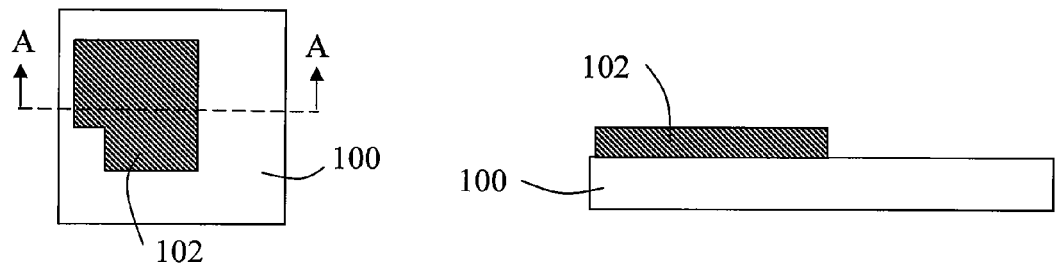
FIGS. 1A to 1F illustrate a prior art TFB fabrication process using masking at every step.
Figure 1B:
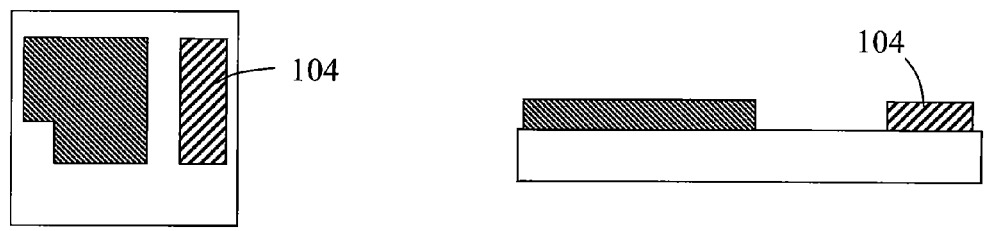

As shown in FIGS. 1A and 1B, processing begins by forming the cathode current collector (CCC) 102 and anode current collector (ACC) 104 on a substrate 100. Note that the terms cathode and anode, as used herein, refer to positive and negative electrodes, respectively. This can be done by (pulsed) DC sputtering of metal targets (~300 nm) to form the layers (e.g., metals such as Cu, Ag, Pd, Pt and Au, metal alloys, metalloids or carbon black), the patterns for the CCC and ACC structures being defined by shadow masks. It should be noted that if a metallic substrate is used, then the first layer may be a "patterned dielectric" deposited after a blanket CCC 102 (the CCC may be needed to block Li in the cathode from reacting with the substrate).

Figure 1C:
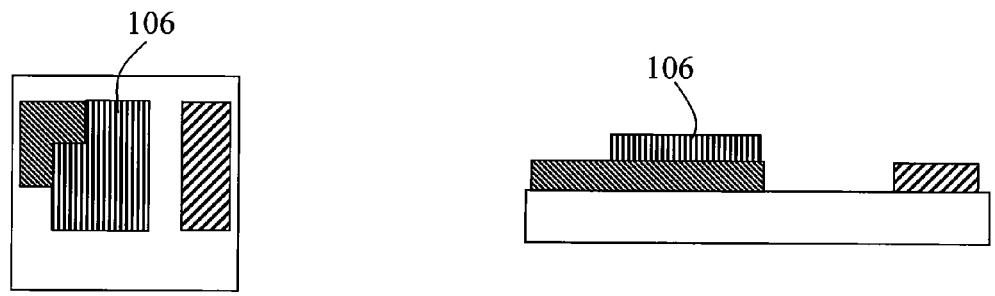
Figure 1D:
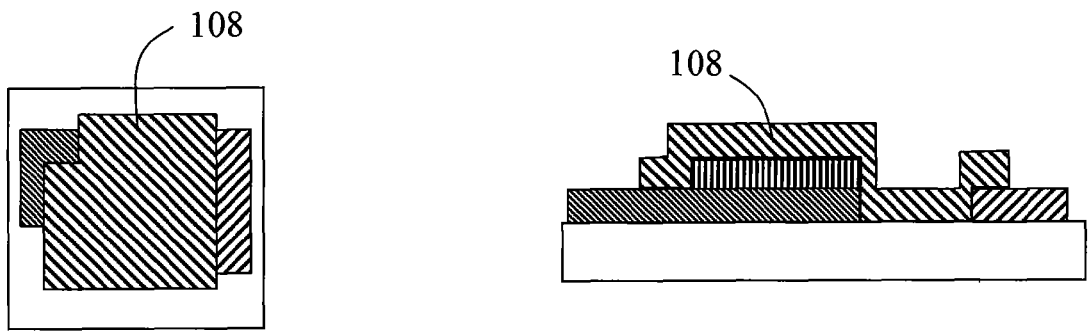

Next, in FIGS. 1C and 1D, the cathode 106 and electrolyte layer 108 are formed, respectively. RF sputtering has been the traditional method for depositing the cathode layer 106 (e.g., $LiCoO_2$) and electrolyte layer 108 (e.g., $Li_3PO_4$ in $N_2$), which are both insulators (more so for the electrolyte). However, pulsed DC has been used for $LiCoO_2$ deposition. The cathode 106 and electrolyte layer 108 patterns are defined by shadow masks.

Figure 1E:
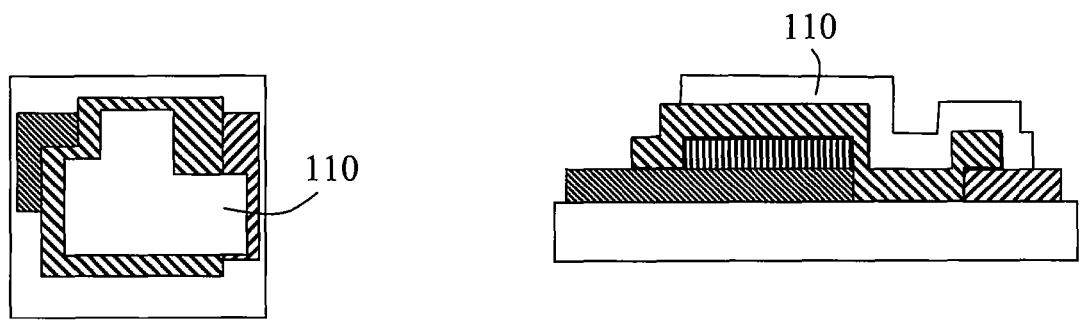
Figure 1F:
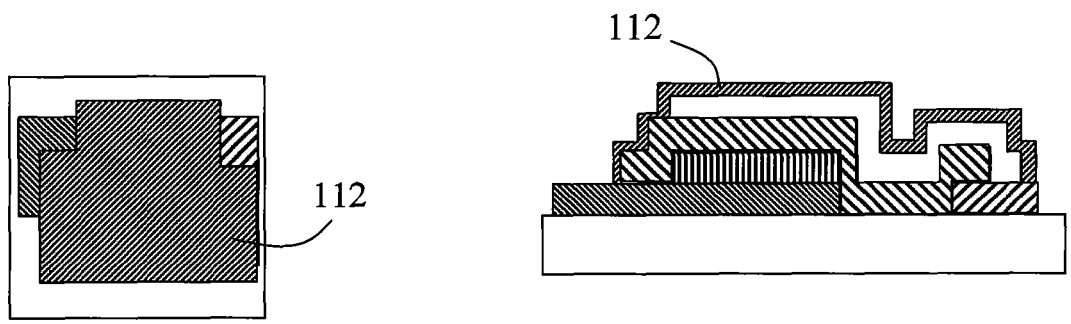

Finally, in FIGS. 1E and 1F, the Li layer 110 and protective coating (PC) layer 112 are formed, respectively. The Li layer 110 can be formed using an evaporation process. The Li layer 110 can be about 3 μm thick (as appropriate for the cathode and capacity balancing) and the PC layer 112 can be in the range of 3-5 μm. The PC layer 112 can be a multilayer of parylene and metal and/or dielectric. See U.S. Pat. No. 5,561,004 to Bates et al. Note that, between the formation of the Li layer and the PC layer, the part must be kept in an inert environment, such as argon gas. The Li layer 110 and PC layer 112 patterns are defined by shadow masks.

The loss of effective substrate area, and therefore the capacity, energy and power densities, is apparent from an inspection of FIGS. 1C and 1F, wherein the area of the cathode 106 is just a fraction of the area of the substrate 100. (The capacity is defined, to first order, by the cathode area and thickness.) Although, further optimization will lead to greater efficiency in area utilization, the intrinsic nature of the process and masking will place an upper limit on such an efficiency. The need for a more elaborate protective coating 112, as described above, can also be seen from FIG. 1F. In particular, the complex shapes and angles of the patterns for the PC layer 112 (which is required to cover the anode but expose the electrical contact points) will likely contribute to non-ideal protection of the Li metal or Li-ion anode 110.

As described previously, all process steps in the prior art embodiment of FIGS. 1A-1F require patterning by physical (shadow) masking. Moreover, depending on the substrate type (ceramic, metal, rigid material, flexible material, plastic/polymer, etc.), additional barrier layers may be necessary. For each layer, the films can be relatively thick, 1 to 10 μm for the electrolyte, cathode and anode layers. Typically, thicker layers are used for the cathode and the anode. When thicker layers are to be deposited, in a currently-used RF configuration, the deposition tool is either static or locally dynamic (translating back and forth) if a "single short module" is used. Moreover, linear processing with continuously moving substrates may not be feasible as very long modules, and longer-distance travel of physical (shadow) masks, will be needed.

Figure 2:
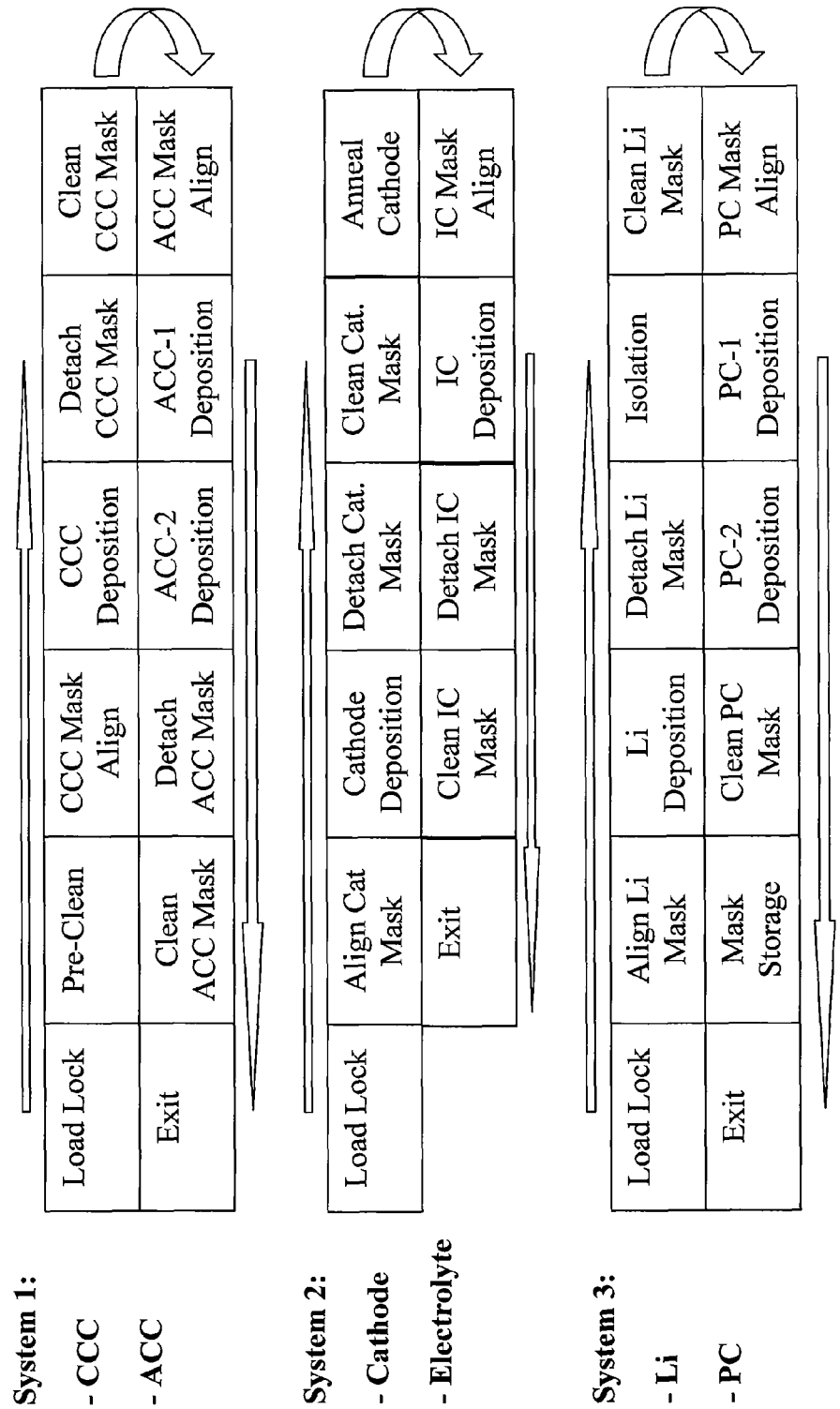
FIG. 2 illustrates the different equipment and processing steps required for a prior art TFB fabrication process for ceramic substrates.
Figure 3:
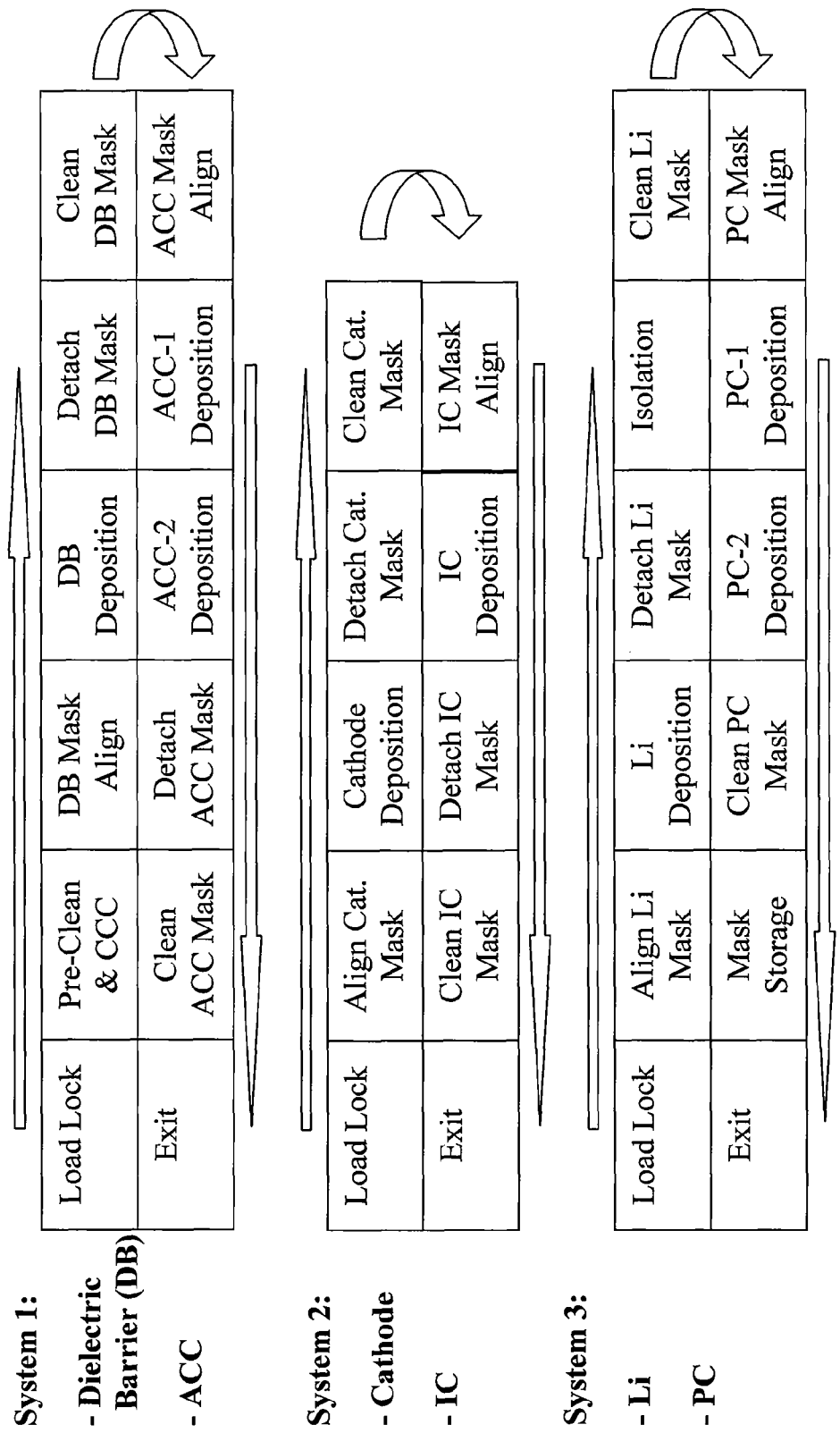
FIG. 3 illustrates the different equipment and processing steps required for a prior art TFB fabrication process for metal substrates.

Based on the flow described in FIGS. 1A to 1F, schematics of conceptual prior art manufacturing flows are shown in FIGS. 2 and 3, for automated processing on ceramic and metal substrates, respectively, when physical (shadow) masks are implemented at each step. These manufacturing flows are suitable for "inline" deposition systems and equipment sets. The arrows indicate the flow of substrates through each system.

System 1 in FIG. 2 illustrates the current collector (CCC and ACC) deposition module, following the process flow of FIG. 1. The first chamber in this system is a pre-clean chamber for removing any incoming surface contaminants. As can be seen, the system requires physical (shadow) mask alignment-attachment and detachment-cleaning modules for both CCC and ACC patterning. Two separate anode current collector modules are shown here so as to accomodate situations where Li reactivity may require dual layers on the anode side. If the CCC and ACC patterning can be done at the same time, and they are of the same materials, then the module may be simplified. System 2 illustrates the cathode (Cat.), anneal (if needed) and electrolyte (IC) modules. Again, there are individual alignment-attachment and detachment-cleaning modules for each patterned layer. System 3 illustrates the Li anode and protective coating modules. In this system, a module necessary to eliminate/minimize cross-talk between the processing ambient of Li and the adjacent deposition module is illustrated with an "isolation" chamber. In addition, the multiple layers for protective coating are illustrated as PC-1 and PC-2. Although not shown in this illustration, there may also be independent physical masking requirements for PC-1 and PC-2. The complexity and additional chamber requirement for physical (shadow) masks are clearly illustrated.

FIG. 3 illustrates the prior art manufacturing flow for conducting substrates. The major difference arises in the system layout where the conducting substrate, used as the CCC, must include an insulating layer to electrically isolate the ACC from the substrate, hence the illustrated patterned deposition of "dielectric barrier (DB)", instead of the CCC as in FIG. 2. Note that the first module—"Pre-Clean & CCC"—is included for the case where an additional layer is needed to isolate the conducting substrate from the Li containing cathode. System 2, in this figure, is practically the same as in FIG. 2, except for the missing anneal step. This is done to illustrate the manufacturing flow for a TFB stack that does not require crystalline cathode materials. System 3 is the same as that in FIG. 2.

As can be seen in FIGS. 2 and 3, an automated physical (shadow) mask management system, required for high-volume manufacturing, is implied by modules for alignment and detachment/cleaning, respectively, at every pre- and post-deposition step. For a static cluster tool system, such as the LCD system provided by AKT America, Inc., a subsidiary of Applied Materials, Inc., of Santa Clara, Calif., an in-situ physical (shadow) mask would need to be placed in the deposition chamber itself. This mask must be aligned, attached to the substrate and held in place during deposition, with an appropriate removal or replacement system for mask regeneration, subsequent to the deposition. In either case, the complexity and high cost of these systems are evident, as a result of meeting the masking requirements.

Reducing and/or minimizing the use of physical (shadow) masks would greatly benefit the manufacturing process, particularly for high-volume manufacturing. One preferred concept for eliminating or minimizing the use of physical masks involves the use of laser scribing, or other alternative maskless patterning techniques, to meet the patterning requirements. As such, embodiments of the invention broadly encompass the use of laser scribing, or other maskless techniques, anywhere during the process as deemed appropriate and necessary for TFB manufacturability, yield and functionality (for example), as well as the number of patterning/scribing steps and wavelengths. This includes a single patterning step at the end of the deposition of all layers or multiple but reduced number of patterning steps where each patterning step adresses single or multiple stack layers. In most embodiments, the layers of the TFB are generally unpatterned, parallel, and coextensive. If the physical (shadow) masking is deemed necessary at some steps, then the disclosed concept can be implemented in conjunction with a minimum number of required physical masks. Furthermore, the disclosed concept can be implemented in conjunction with other physical maskless patterning techniques, like photolithographic patterning, at some steps.

Benefits of the disclosed concept include the minimization or elimination of non-functional areas on the substrate. Another benefit is that the laser allows flexibility in device patterning to accommodate end-market defined form factors, without having to create new expensive physical (shadow) masks or reticles (for photolithography, in general). Implementing the integration with reduced number of reticles for photolithographic process will also enhance the cost factor. Yet another benefit is that the anode current collector can also function as the protective coating, eliminating or minimizing the need for complex multilayers or other schemes to package the device. The anticipated need for edge protection will be discussed below, with reference to FIG. 6. An additional benefit to moving away from a physical (shadow) masking technology is the positive impact to yield that will be realized.

Figure 4A:
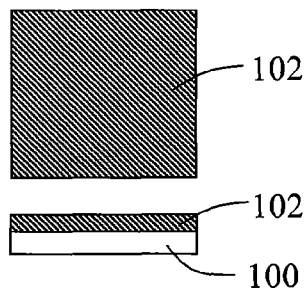
FIGS. 4A to 4G illustrate an example HVM TFB fabrication process according to aspects of the present invention.
Figure 4B:
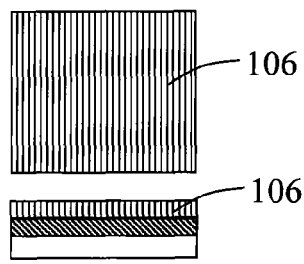
Figure 4C:
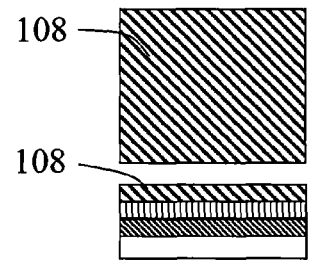
Figure 4D:
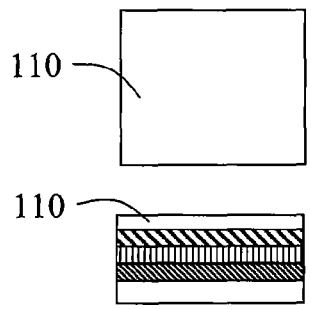
Figure 4E:
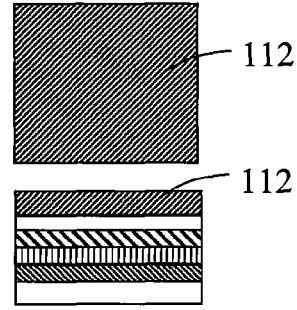
Figure 4F:
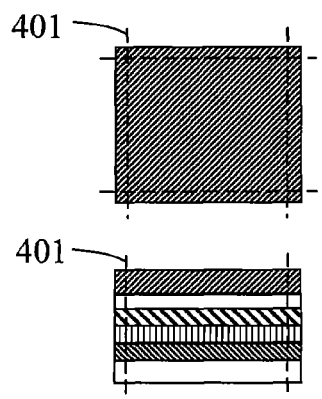
Figure 4G:
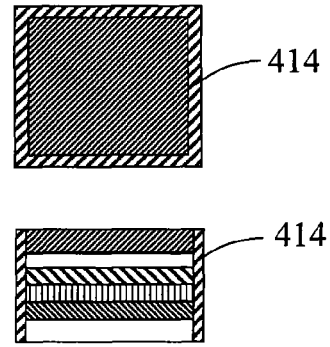

FIGS. 4A to 4G show one embodiment of the invention applied to the TFB fabrication flow for electrically conductive substrates, such as metallic substrates, using a single laser scribing step. This flow is based on blanket (mask-less) deposition of: the CCC layer 102, shown in FIG. 4A; the cathode layer 106, shown in FIG. 4B; the electrolyte layer 108, shown in FIG. 4C; the anode layer 110, shown in FIG. 4D; and the PC/ACC layer 112, shown in FIG. 4E. This is followed by a physical maskless patterning step(s), using, e.g., laser scribing, for device patterning, shown in FIG. 4F, and by a final packaging step to protect the exposed edges, shown in FIG. 4G. In FIG. 4F, the position of the laser cut is indicated by lines 401. In FIG. 4G, the edge protection material 414 may include polymer, dielectrics and/or metals. Polymer can be deposited by using, for example, ink jet printing or dip coating, the first of which is a selective additive process. Dielectric and or metal, if needed, can be coated using conventional vacuum deposition techniques. In such a case, one may deposit the dielectric layer first to maintain the isolation between two electrodes. Subsequent to the deposition, the contacts can be exposed using the laser ablation. The process flow of FIGS. 4A-4G is equally representative of using other alternative physical (shadow) maskless patterning techniques, such as mechanical sawing, water/solvent knifing, ion beam milling and photolithography.

The process flow of FIGS. 4A-4G shows only a single TFB. However, this process is applicable to large or continuous substrates which are patterned to provide a multiplicity of TFB devices. For example, the cuts 401 in FIG. 4F can be used to not only delinate a single TFB, but also to separate the single TFB from adjacent TFBs by cutting through the substrate 100.

Various types of lasers can be used to perform the scribing function, illustrated in FIG. 4F, depending on the optical absorption characteristics of the materials used for the TFB structure, and the materials stack at the time of scribing (e.g., multiple stacks as in FIG. 4). Some of the lasers that can be employed include high power $CO_2$ lasers (e.g., 10 um wavelength), Nd-doped solid state lasers (e.g., Nd:YAG at 1046 nm) and diode lasers. In addition, continous and pulsed (even to femto second) lasers can be used.

Figure 5:
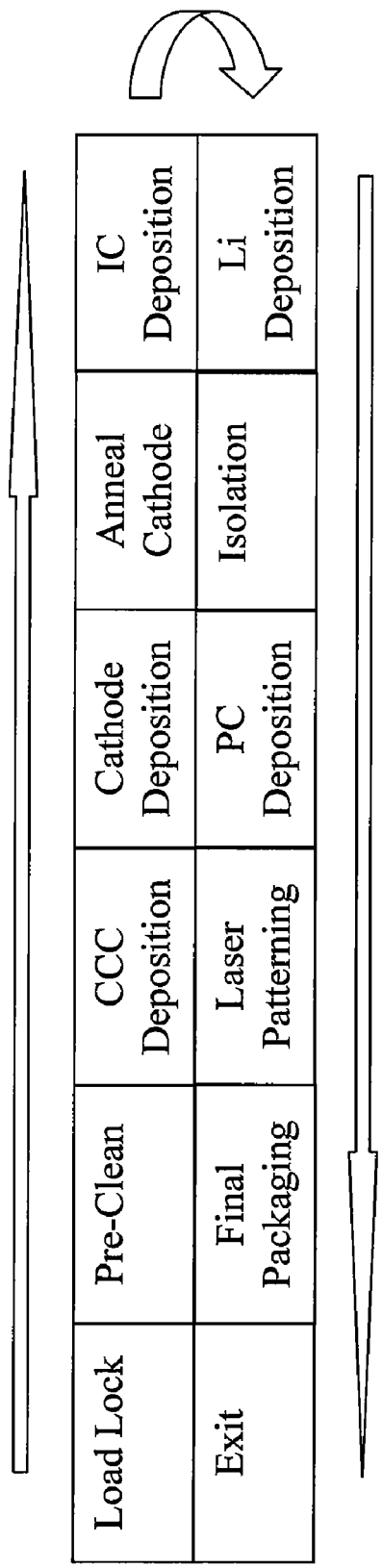
FIG. 5 illustrates example equipment and processing steps required for the HVM TFB fabrication process according to aspects of the present invention.

The schematic representation of a system corresponding to the process shown in FIGS. 4A-4G is shown in FIG. 5. Compared to FIGS. 2 and 3, the HVM concepts for the prior art, the new HVM concept consists of a significantly simpler equipment set. The concept of a shadow maskless process flow is independent of the equipment type, and therefore, is equally applicable to cluster, inline and roll-to-roll (web) coaters. It is also independent of the material components of the TFB and substrate types (e.g., ceramic, metal, rigid material, flexible material, and plastic/polymer).

When ceramic substrates are used, where the substrate cannot be used as the contact to external circuits, an additional scribed patterning may expose the cathode current collector (CCC). This extra patterning can easily be done at the scribing step. Also, the final packaging step will need to be modified to protect the newly exposed edge areas, but not the exposed CCC layer. Thus, in some embodiments, patterning may comprise forming trenches in the layers of the TFB and the filling the trenches with an encapsulating material.

In addition to the aspects of laser scribing for the patterning of TFBs, embodiments of the invention provide additional methods and solutions to form the subsequent protective coating in a laser scribing process, wherein the absence of physical (shadow) masking leads to loss of ability to create overlaps to ensure isolation between layers as well as to exposed materials at the edge of the TFBs after laser scribing. The problems with exposed edges will be most severe if the patterning is done at the end of, or toward the end of, the deposition steps.

The metal current collectors, both on the cathode and anode side, may function as protective barriers to the shuttling Li ions. In addition, the anode current collector may function as a barrier to the oxidants ($H_2O$, $O_2$, $N_2$, etc.) from the ambient. Therefore, the material or materials of choice preferably have minimal reaction or miscibility in contact with Li in "both directions"—i.e., the Li moving into the metallic current collector to form a solid solution and vice versa. In addition, the material choice for the metallic current collector preferably has low reactivity and diffusivity to those oxidants. Based on published binary phase diagrams, some potential candidates for the first requirements are Ag, Al, Au, Ca, Cu, Sn, Pd, Zn and Pt. With some materials, the thermal budget may need to be managed to ensure there is no reaction/diffusion between the metallic layers. If a single metal element is incapable of meeting both requirements, then alloys may be considered. Also, if a single layer is incapable of meeting both requirements, then dual (multiple) layers may be used.

The final laser patterning and edge encapsulation can be done in many ways. However, one preferred post-deposition sequence comprises patterning, edge encapsulation, and cutting, in the manner shown in FIGS. 6A to 6D, respectively. This allows substrate-based rather than individual cell-based processing. More specifically, FIG. 6A shows a stack 610, where the stack includes a substrate, CCC layer, cathode layer, electrolyte layer, anode layer and PC/ACC layer. See FIGS. 4A-4E for more details. The stack 610, apart from the substrate 100, is then laser patterned, resulting in stack 620, shown in FIG. 6B. The edges of the stack that were exposed by patterning are encapsulated, resulting in stack 630, shown in FIG. 6C. The adherent encapsulating material 614 is preferably electrically insulating and capable of passivating the exposed surfaces, with low permeability to ambient oxidants, like $O_2$ and $H_2O$. Thus, one sequence/stack for protecting the exposed edge is by using dielectric layer(s), such as $Si_3N_4$ and $SiO_2$ ($Si_3N_4$ first), deposited using conventional methods, like PVD or CVD. Another sequence involves dielectric deposition followed by polymer (ink jet dispensing followed by UV-curing) or by metal layer deposition, again using conventional vacuum deposition. In either case, the coated ACC area may be laser ablated, for example, to expose the contact area. Suitable UV-curable polymer can be used by itself as well. The stack is then cut along lines 601 to produce multiple devices, as shown in FIG. 6D. The cutting is done using a laser scribing process, or alternative scribing process, as described above.

Figure 7A:
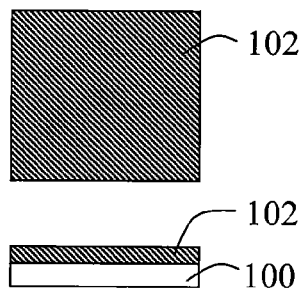
FIGS. 7A to 7G illustrate an alternative example HVM TFB fabrication process according to aspects of the present invention.
Figure 7B:
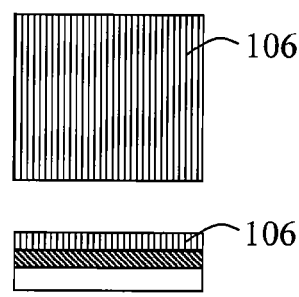
Figure 7C:
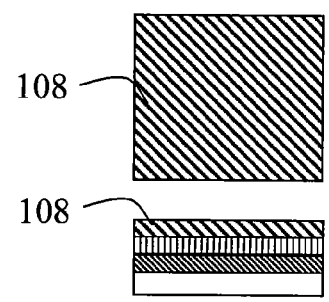
Figure 7D:
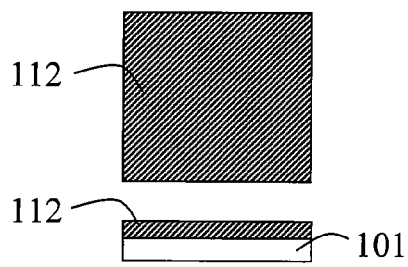
Figure 7E:
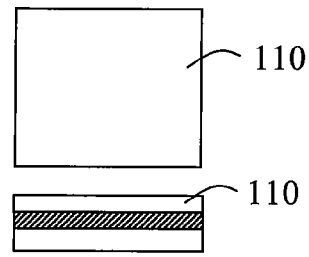
Figure 7F:
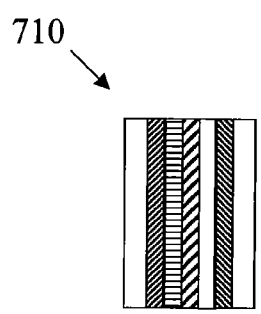
Figure 7G:
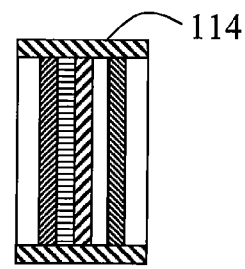

Another embodiment of the fabrication flow is shown in FIGS. 7A to 7G. In this flow, two substrates are used, one each for cathode and anode sides, which are then laminated to form the TFBs. Both sides follow the same physical maskless blanket deposition approach shown in FIGS. 4A-4E. The cathode side is shown in FIGS. 7A to 7C, and the anode side follows it in the reverse order—anode current collector 112 (or metallic barrier layer) followed by the Li metal 110 in FIGS. 7D and 7E. Although the representation shows cathode side to the electrolyte layer 108, the deposition can be carried through Li to enable a Li—Li interface during the lamination step. This may enhance the intimate interfaces throughout the TFB structure and enhance the lamination process. This lamination can be performed by pressure rolling the two pieces at an elevated temperature. The "soft" and reactive Li layer will function as the adhesive layer. The laminated structure 710 in FIG. 7F, independent of the interface, can be enhanced by heat treatment (thermal or otherwise) during the lamination process. The lamination temperature should be in the range of 50 to 150 C, below the melting temperature of Li. The applied pressure should range between a few to several atmospheres. Analogous to FIG. 4F, laser patterning and final packaging will follow in FIG. 7G, respectively thereafter, for device patterning and edge protection. Again, the final patterning and edge encapsulation can be done on large area substrates, following the flow shown in FIGS. 6A-6D and the process provided in reference to the figure. In this case, however, the laser scribing will need to cut through one of the substrates to get to the structure shown in FIG. 6B.

Referring again to FIGS. 4A-4G and 7A-7G, when the substrates are electrically conductive, the process flows and structures may be further simplified. For example, when a metallic substrate 100 is used in the process flow shown in FIGS. 4A-4G, the substrate may be used as a cathode current collector, thus eliminating the need for a CCC deposition step. Similarly, when a metallic substrate 101 is used in the process flow shown in FIGS. 7A-7G, the substrate may be used as an anode current collector, thus eliminating the need for an ACC deposition step.

Even though the embodiments of the invention shown in FIGS. 4A-4G, 6A-6D and 7A-7G show all layers being unpatterned by physical (shadow) masks, other embodiments with some layers being patterned by physical (shadow) masks (or preferably with additional physical maskless patterning steps) and other layers being unpatterned are envisaged as being advantageous over the prior art, as discussed generally above. For example, process flows and structures are envisaged wherein at least one layer is unpatterned by a physical mask during deposition. Furthermore, multiple physical maskless patterning steps may be used—for example, there may be a first patterning step after the cathode layer deposition (FIG. 4B) and a second patterning step after the anode current collector deposition (FIG. 4F). This two step patterning may allow better encapsulation of the cathode by the subsequent electrolyte deposition.

As stated, the advantages of the concepts and methods can be inferred from the figures and discussions. First, the cost and complexity associated with physical (shadow) masks are eliminated. Second, the efficient use of the substrate area for maximum capacity is clear from a comparison of FIGS. 1, 4, and 6. And, lastly, reduced or eliminated physical (shadow) mask requirements bring to reality a flexible form factor, which now merely warrants a recipe change at the laser scribing and packaging steps, rather than necessitating actual changes to physical (shadow) mask sets comprised of 5 to 6 layers. Use of photolithographic patterning in conjunction with the concept of reduced patterning steps or patterning multiple layers, also leads to, though slightly more complex, improved flexibility and cost reduction.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method of manufacturing thin film batteries comprising:
   providing a substrate;
   depositing a thin film battery structure comprising a plurality of layers on said substrate, said layers including, in order of deposition, a cathode, an electrolyte and an anode, wherein at least one of said deposited layers is unpatterned and has no mask;
   depositing a protective coating; and
   patterning said layers and said protective coating using one or more maskless physical patterning processes, wherein said patterning forms trenches in said layers.

2. The method of claim 1, further comprising, after said patterning, filling said trenches with an encapsulating material.

3. The method of claim 2, further comprising, after said filling, cutting through the filled trenches and said substrate, producing a multiplicity of said thin film batteries.

4. The method of claim 1, wherein said substrate is electrically conductive.

5. The method of claim 4, wherein said electrically conductive substrate also functions as a cathode current collector.

6. The method of claim 1, wherein said protective coating is an anode current collector.

7. The method of claim 1, wherein each of said one or more maskless physical patterning processes is selected from the group consisting of laser scribing, mechanical sawing, water/solvent knifing, ion beam milling, and photolithography.

8. The method of claim 1, wherein all of said layers are unpatterned, parallel and co-extensive.

9. The method of claim 1, further comprising, after said patterning, encapsulating exposed edges of said layers.

10. The method of claim 1, wherein said patterning cuts through said substrate, producing a multiplicity of said thin film batteries.

11. The method of claim 10, further comprising, after said patterning, encapsulating exposed edges of said layers.

12. The method of claim 1, wherein the one or more maskless physical patterning processes includes a laser scribing process.

* * * * *

UNITED STATES PATENT AND TRADEMARK OFFICE
CERTIFICATE OF CORRECTION

| | | |
|---|---|---|
| PATENT NO. | : 8,168,318 B2 | Page 1 of 1 |
| APPLICATION NO. | : 12/257049 | |
| DATED | : May 1, 2012 | |
| INVENTOR(S) | : Kwak et al. | |

It is certified that error appears in the above-identified patent and that said Letters Patent is hereby corrected as shown below:

Title Page, Inventors (76):

Please delete "Eisenbeiser" and insert -- Eisenbelser -- therefor.

Signed and Sealed this
Fourteenth Day of August, 2012

David J. Kappos
*Director of the United States Patent and Trademark Office*